C. C. LANE.
AUTOMOBILE CLUTCH CONTROLLING DEVICE.
APPLICATION FILED AUG. 4, 1915.
1,186,009.
Patented June 6, 1916.
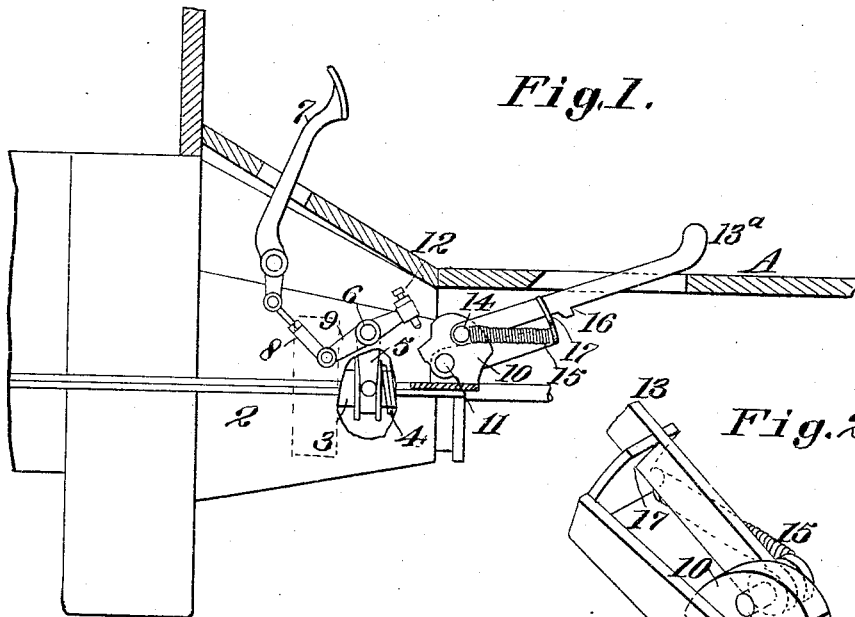
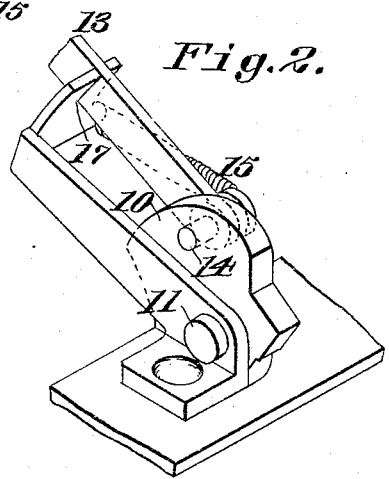
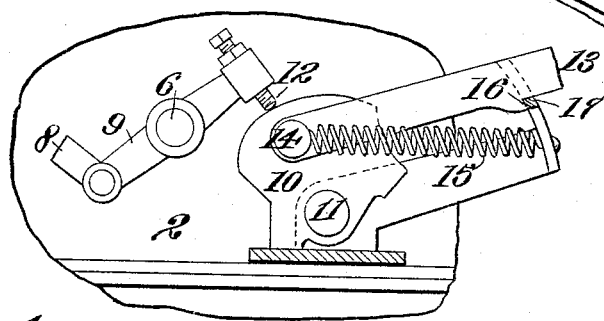
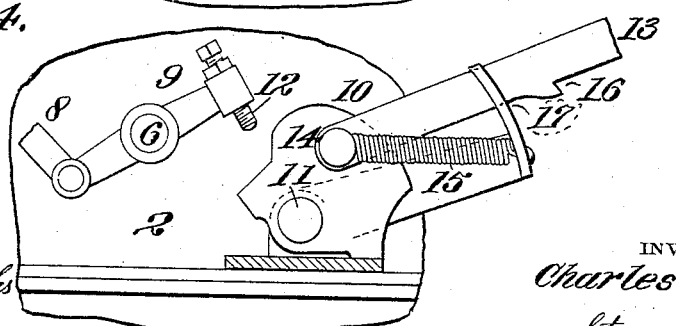
WITNESSES:
Charles Pickles
J. H. Herring
INVENTOR
Charles C. Lane.
BY Strong & Townsend
ATTORNEY
THE COLUMBIA PLANOGRAPH CO., WASHINGTON, D. C.

UNITED STATES PATENT OFFICE.

CHARLES C. LANE, OF SAN FRANCISCO, CALIFORNIA.

AUTOMOBILE-CLUTCH-CONTROLLING DEVICE.

1,186,009. Specification of Letters Patent. Patented June 6, 1916.

Application filed August 4, 1915. Serial No. 43,583.

*To all whom it may concern:*

Be it known that I, CHARLES C. LANE, a citizen of the United States, residing in the city and county of San Francisco and State of California, have invented new and useful Improvements in Automobile-Clutch-Controlling Devices, of which the following is a specification.

My invention relates to improvements in automobile controlling mechanism, and it consists of a rockable cam and operating means, whereby the transmission gear controlling clutch may be retained in its disengaged or neutral position.

It also consists in details of construction which will be more fully explained by reference to the accompanying drawings, in which—

Figure 1 is a detail section showing my invention applied to an automobile. Fig. 2 is a perspective view of the device. Fig. 3 is a detail view showing clutch released. Fig. 4 is a detail view showing position of parts when the clutch is engaged.

The driving or crank shaft of an automobile is connected with the transmission gear by means of a spring-primed clutch which normally maintains the connection, but is disengaged whenever it is desired to change the engagement of the gears, or to allow the engine to continue in motion without transmitting any power.

My invention is designed to provide a means by which the clutch may be disengaged, and retained in that condition for any desired length of time.

As shown in the drawings, A is the foot board, and 2 is the clutch case of an automobile, this case being broken away to disclose the clutch collar 3 and the spring 4 by which the clutch members are normally engaged. 5 is an arm mounted upon a shaft 6 and having its opposite end engaged with the movable member of the clutch, so that by rocking this arm, the clutch member may be moved. This is usually effected by means of a foot lever 7 connected by a link 8 with a rocker arm 9, which is fixed to turn the shaft 6 and thus move the arm 5 to shift the clutch. An objection to this method of operation is that the brake is also operated by the lever 7, and with the gearing employed in the Ford car (to which my invention is applied), care must be exercised to place the gearing in a neutral position, and not shift it directly from high to low, or the opposite, in such a manner as to be liable to injure the gear.

My invention is designed to provide a means to insure the gearing being positively placed in the neutral position, and it consists of a cam 10 pivoted and turnable upon a pin 11, and in the plane of oscillation of the lever 9. The end of the lever 9 has an adjustable pin 12 which is adapted to contact with the periphery of the cam when said cam is in line with the pin, and this insures the gearing being moved only sufficiently to place it in a neutral position, while the cam is in position to arrest the movement of the lever 9. The operating mechanism for this cam consists of a foot lever 13 having one end pivoted to the cam at 14 so that by pressure upon the opposite end 13$^a$ of the foot lever, it will be advanced and the cam turned upon its pivot 11. A spring 15 connects the pin 14 with a stationary part and the contraction of that spring turns the cam so as to carry it out of control with the lever 9 and pin 12, which is its normal position.

The lever 13 has a shoulder 16, which is engageable with a stop 17 when by pressure upon the foot lever 13, the spring 15 has been extended and the cam 10 turned into position to engage the lever 9 and thus move it to disengage the clutch, by turning the lever 9, and acting through the lever 5 to compress the spring 4. This movement of the cam is always the same and thus insures the disengaging of the gears and placing them in a neutral position without depending upon "feeling". When the lever is released, it is returned by the spring 15 and the cam turns out of the path of the lever 9; and the gears may then be meshed for either speed.

Having thus described my invention, what I claim and desire to secure by Letters Patent is—

1. The combination with a clutch, a spring by which its members are engaged, a lever by which the spring is compressed to disengage the clutch, of a cam, a spring by which the cam is normally held out of engagement with the lever, a foot lever connected with the cam, and a holding catch therefor, said retracting spring being connected with the lever.

2. A means to limit the movement of the clutch disengaging lever of an automobile, said means including a cam movable into and out of the path of the lever, a foot lever by which the cam is turned into intercepting position, a holding catch, and a spring by which the lever and cam are returned from engagement with the cam.

In testimony whereof I have hereunto set my hand in the presence of two subscribing witnesses.

CHARLES C. LANE.

Witnesses:
 JOHN H. HERRING,
 FREDERICK RUSS.

Copies of this patent may be obtained for five cents each, by addressing the "Commissioner of Patents, Washington, D. C."